April 9, 1968     JEAN-MICHEL BACQUART     3,377,536

ELECTRIC DRIVING DEVICE WITH CONTROLLED SPEED

Filed Feb. 15, 1965

INVENTOR.
JEAN M. BACQUART
BY
*Frank P. Difani*
AGENT

United States Patent Office 3,377,536
Patented Apr. 9, 1968

3,377,536
ELECTRIC DRIVING DEVICE WITH CONTROLLED SPEED
Jean-Michel Bacquart, Antony, France, assignor to North American Philips Company, Inc., New York, N.Y., a corporation of Delaware
Filed Feb. 15, 1965, Ser. No. 432,460
17 Claims. (Cl. 318—246)

The invention relates to an electric driving device with controlled speed, and more particularly to a control circuit for a monophase commutator motor having a series field winding energized from an alternating current source by means of one or more controlled rectifiers. The term "controlled rectifier" includes a thyratron, an ignitron or, preferably a semiconductor controlled rectifier, for example, a thyristor.

Monophase commutator motors with series excitation have very favorable properties for many uses, inter alia a maximum starting torque, a speed of revolution variable oven a wide range and in accordance with the effective value of the supplied current, and an advantageous efficiency which is acceptable at the extreme speeds and fairly high within a wide speed range.

However, the speed of revolution also varies greatly with the driving torque.

It is known to control the effective value of the current supplied to an electric motor by means of a controlled rectifier, for example, with a motor of the kind set forth in order to control or to stabilise the speed of revolution. For example, a comparison is made between the pulses or the voltage from a motor-driven tachometer generator with pulses or a reference voltage corresponding to the desired speed. The result of said comparison is used for controlling the instant of ignition of the rectifier during each half period of suitable polarity of the supply voltage.

The invention has for its object to provide a very simple device of the kind described above, in which neither a tachometer generator nor a pulse source or a reference voltage source are required, but nevertheless the speed of revolution of the motor can be maintained at a desired value which can be chosen and adjusted within a very large range of speeds, and which is substantially independent of the driving torque supplied by the motor.

The device according to the invention is characterized in that, during each half period of suitable polarity of the supply voltage, i.e. of the polarity which corresponds to the direction in which the controlled rectifier can be rendered conducting, the ignition of said controlled rectifier is determined jointly by the charge of a capacitor through a resistor by said supply voltage and by the counter E.M.F. of the motor armature. Furthermore, the energizing winding is shunted by a member which allows a circulating current to pass through said winding for the time between the extinction of the rectifier and the subsequent ignition of this rectifier, or of a further rectifier, during the subsequent period or half period of the supply voltage. The use of controlled rectifiers, and particularly of semiconductor controlled rectifiers, provides a simple means for controlling the effective value of the current supplied to a motor by varying the instant of ignition of each rectifier during the half period of the alternating supply voltage during which this rectifier can be rendered conducting. In a device according to the invention, the energy losses produced by the speed control can thus be restricted to the energy required for periodically charging the capacitor through the charging resistor.

Since use is made of controlled rectifiers which only return to their non-conducting state when the current drops below a given holding value, the invention only can be used with a current source supplying alternating current, or a pulsatory current, to the motor. In the case of a direct current source, it would be necessary to provide the rectifier with means comprising at least one oscillating circuit and ensuring a periodic extinction of the rectifier, so that the direct current is converted into an alternating current or a pulsatory current of a given frequency. On the other hand, since the series energizing winding of the motor is also energized through the rectifier, the energizing field and hence the counter E.M.F. at the motor armature would normally be zero, or approximately zero, between two supply current pulses. However, this counter E.M.F. is required during said period of time for varying the instant of ignition of the rectifier during the subsequent half period of suitable polarity in accordance with the speed of revolution of the motor. It is therefore necessary to maintain the energizing field produced by a current pulse at least until the instant of occurrence of a subsequent current pulse, i.e. until the subsequent instant of ignition of the rectifier or of a further rectifier. In accordance with the invention, the maintenance of the energizing field is obtained by shunting the energizing winding by a member allowing a circulating current to pass through the winding.

This member may be an impedance constituting, together with the series energizing winding, an oscillatory circuit tuned to the frequency of the supply current pulses, i.e. to the frequency of the supply voltage or to a frequency equal to half that of said voltage. The damping of said tuned circuit preferably lies below the so-called critical damping at which the circulating current no longer changes polarity. A further possibility, when the motor is supplied with a pulsatory, rectified current, consists in preferably forming said member by a rectifier having such a resistance in the pass direction that $L/R$ time constant of the circuit comprising the series energizing winding having an inductance L, and the rectifier having an overall resistance R, exceeds a period, or a half period, of the alternating supply voltage according as only one half period, or the two half periods, of the supply voltage are employed.

It will be obvious that the means for determining the instant of ignition of the controlled rectifier going out from the charging of the capacitor, and from the counter E.M.F. of the motor armature, may take many different forms. They preferably comprise an element having a threshold voltage which becomes abruptly conducting when a resultant voltage derived from the supply voltage for charging the capacitor and from the counter E.M.F. of the motor armature exceeds said threshold voltage. The capacitor may be connected so that it is discharged through said element. The discharge current is then used to produce an ignition pulse which is supplied to the control electrode of the rectifier.

The invention will be described more fully with reference to the accompanying drawing which shows a few embodiments of the device according to the invention.

Figure 1:
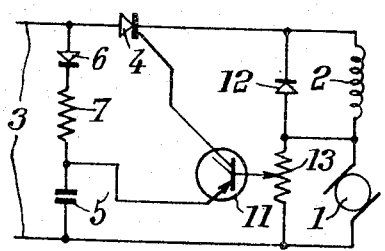
FIG. 1 shows the diagram of a first embodiment.

The electric driving device with speed control, the diagram of which is shown in FIG. 1, comprises a monophase commutator motor having a rotor 1 forming the armature and a stator having a series inductor winding 2. This motor 1, 2 is fed from an alternating current source by means of a semiconductor controlled rectifier 4. This rectifier may, of course, also be formed by a thyratron, an ignition or even, in accordance with the motor power, by a gas triode having a cold cathode, or any other controlled rectifier.

One of the terminals of the source 3 is connected to the anode or the corresponding electrode of the rectifier 4. The cathode or the corresponding electrode thereof is directly connected to the winding 2, whereas the other terminal of the source is directly connected to the rotor 1. A capacitor 5 is connected on the one hand directly to the junction of the rotor 1 and the source 3 and on the other hand to the junction of the source 3 and the anode of the rectifier 4 through a charging circuit having a rectifying element 6 and a resistor 7. The control electrode of the rectifier 4 is directly connected to the collector of a current amplifying transistor 11, for example, a p-n-p transistor. Transistor 11 constitutes the element having the threshold voltage which will, abruptly conduct when the applied voltage exceeds said threshold voltage. The emitter of the transistor 11 is connected to the junction of the capacitor 5 and the resistor 7, whereas the base is connected to the tapping of a potentiometer 13 which is connected in parallel with the armature 1.

The winding 2 is furthermore connected in parallel with a rectifying element 12 which is connected in the cut-off direction with respect to the current passing through the rectifier 4 after ignition.

The device described above operates as follows.

During each half period of suitable polarity of the alternating voltage from the source 3, i.e. during each half period in which the anode of the rectifier 4 is at a positive polarity relative to the other terminal of the source, the rectifier 4 is ignited at an instant which is determined simultaneously by the charging of the capacitor 5 by said voltage through the charging circuit 6, 7, including the charging resistor 7, and by the counter E.M.F. of the armature 1 of the motor 1, 2. The transistor 11 becomes abruptly conducting at the instant when the voltage across the capacitor 5 exceeds the portion of the counter E.M.F. of the armature 1 which is fed to the base and occurs across the lower part of the potentiometer 13, and said portion serving as a threshold voltage. It will be obvious that this instant may be varied within a wide range by varying the value of the charging resistor 7 or of the value of the capacitor 5 or else, preferably, as is shown, by varying the potentiometer 13.

It is known that the counter E.M.F. of the motor armature is proportional to the angular velocity $\omega$ of the armature with respect to the inductor, and to the magnetic field $\phi$ through said armature: $F=k\phi n$, wherein $k$ is a constant and $n=\omega/2\pi$, i.e. the angular velocity in rev./sec.

Figure 2:
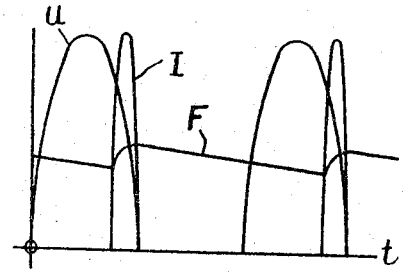
FIG. 2 shows the diagram for explaining the operation of the device according to the invention.

It will be assumed that the device is adjusted so that the rectifier 4 ignites only towards the end of the positive half period of the supply voltage U (FIG. 2), for example, at about 135°. The armature 1 and the inductor winding 2 of the motor are traversed by a short current pulse I since the rectifier extinguishes about 45° later. The energizing field will therefore drop almost directly to a very low value which corresponds to the magnetic remanence of the magnetic circuit of the motor 1, 2, which also applies to the counter E.M.F. F of the armature 1. Owing to the provision of the rectifier 12, connected in parallel with the inductor winding 2, a current continues to pass through this winding and through said rectifier after the current pulse I has decreased to zero. The electric energy accumulated in the inductor counteracts the abrupt interruption of the energizing current and the current through the winding 2 decreases exponentially after each positive half period of the voltage U, i.e.

$$I_2 = I_{max} \cdot e^{-tR/L}$$

wherein $I_{max}$ is the amplitude of the current pulse I, $t$ is the time from the instant when the current pulse I attains the maximum amplitude, R the overall resistance of the circuit comprising the winding 2 and the rectifier 12, and L the inductance of said circuit. In practice, variations of $I_2$ of the order of a few percent are obtained. The counter E.M.F. F also varies approximately in the same ratio, but in general, to a lesser extent owing to a certain degree of saturation of the magnetic circuit of the motor 1, 2 which appears as soon as the current I increases, for example, due to an increase in the driving torque supplied by the motor.

Between the current pulses I, the current $I_1$ in the armature 1 is interrupted so that practically only the total E.M.F. F is supplied to the potentimeter 13 instead of the value $F - I_1 R_1$, wherein $I_1$ is the instantaneous value of the current through the armature 1 and $R_1$ is the ohmic resistance thereof.

In any control position of the tapping of the potentiometer 13, the rectifier 4 is therefore ignited by the discharge of the capacitor 5 through the transistor 11 at the instant when the charging voltage of said capacitor exceeds the portion of the counter E.M.F. F which corresponds to said adjustment. In each of said control positions the device will reach a given state of equilibrium which corresponds to a particular counter E.M.F., and hence to a given speed. This selected speed will be affected only little by the driving torque N required from the motor, as far as the counter E.M.F. in itself is affected only little by the charging couple. In practice, saturation of the magnetic circuit of the motor appears at a fairly low torque, of the order of one tenth of the maximum torque which the motor is capable of supplying in continuous operation, so that the counter E.M.F. is substantially independent of the load or the motor.

It will be obvious that in the embodiment described above, the rectifier 6 is not essential and only serves to prevent the capacitor 5 from being charged negatively during the half periods of the supply voltage U during which the rectifier 4 should not become conducting. In this manner the peak value of the reverse voltage is applied between the base and the emitter of the transistor 11, which is equal to the difference between the portion of the counter E.M.F. F of the armature 1 that occurs across the lower part of the potentiometer 13 and the voltage of the capacitor 5. This peak value is equal to the value of the said portion of the counter E.M.F. instead of being equal to at least twice said portion, which would be the case in the absence of the rectifier 6.

Figure 3:
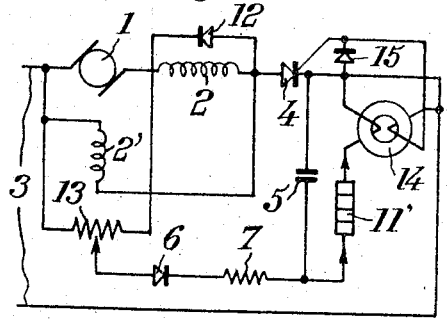
FIGS. 3 to 6 show the diagrams of four further embodiments of said device.

The second embodiment, which is shown diagrammatically in FIG. 3, in which the same parts are designated by the same reference numerals, exhibits a few modifications:

(a) The stator of the motor is provided with a second inductor winding 2' of the compound type, which is connected in parallel with the series combination of the armature 1 and of the series inductor winding 2. This second inductor winding may be conductive to vary the functional properties of the motor 1, 2, which may thus obtain approximately the properties of a shunt motor i.e. a speed of rotation which is practically independent of the driving torque required from the motor.

(b) The transistor 11 is replaced by a four-layer trigger diode 11' which is connected in series with the primary winding of a pulse transformer 14 across the capacitor 5. The diode 11' has a natural threshold value in the pass direction and becomes abruptly conducting when the applied voltage exceeds said threshold voltage. In the reverse sense the diode has a much higher threshold voltage above which it becomes conducting by a breakdown of the p-n junctions.

(c) The capacitor 5 is connected so that it is charged by the difference between the voltage of each positive half period of the voltage U from the source 3, and the portion of the counter E.M.F. F of the armature 1 of the motor which appears between the terminals of the left-hand part of the potentiometer 13.

As soon as the charging voltage of the capacitor 5 exceeds said threshold voltage of the diode 11', the latter becomes conducting and the capacitor 5 is discharged across said diode and the primary winding of the transformer 14. This transformer has a secondary winding which is connected between the cathode and the control electrode of the rectifier 4 so that the latter is ignited by the current pulse produced by each discharge of the capacitor 5 through the diode 11'.

The diode 15, which is connected in parallel with the secondary winding of the transformer 14, serves to pass the reverse current which tends to flow between the control electrode of the semiconductor rectifier 4 and the cathode thereof when this rectifier becomes non-conducting. Also this diode might be omitted, in which case the core of the transformer 14 would be magnetically polarised in one direction by each pulse and in the reverse direction by each pulse produced at the extinction of the rectifier 4. This reverse current pulse would, however, produce a reverse voltage pulse across the primary winding of the transformer 14, which pulse would be supplied to the diode 11' and might be undesirable for this diode.

It also will be obvious that in the embodiment shown in FIG. 3, one speed of rotation of the motor 1, 2 corresponds to each control position of the potentiometer 13, which speed is substantially not effected by the driving torque desired from the motor.

Figure 4:
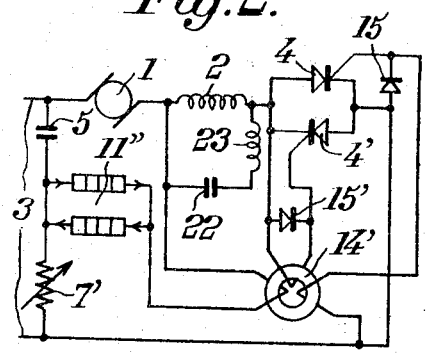

The embodiment shown in FIG. 4 is distinguished from that of FIG. 3 by the replacement of the rectifier 4 by two rectifiers 4 and 4', which are connected in parallel opposition. In this way the series commutator motor 1, 2 may be fed from current pulses of alternating polarity, i.e. the controlled alternating current. For controlling the alternate ignition of the rectifiers 4 and 4', the transformer 14 is replaced by a transformer 14' having two secondary windings. The secondary windings are individually connected to the control circuits of the rectifiers 4 and 4'. As in FIG. 3, diodes 15 and 15', respectively, are connected in parallel with the secondary windings and serve to pass the reverse current pulse produced at the extinction of the rectifier concerned.

The unilaterally conducting diode 11' is replaced by a bilaterally conducting diode or, as is shown, by two diodes in parallel opposition, which together constitute a bilaterally conducting device 11".

The diode 6 is, of course, omitted and the potentiometer 13 is replaced by a variable resistor 7', through which the capacitor 5 is charged more or less rapidly by the alternating voltage from the source 3. The difference between the phase-shifted alternating voltage, which is thus produced across the capacitor 5, and the overall counter E.M.F. (alternating voltage) of the armature 1, is applied to the bilaterally conducting device 11" in series with the primary winding of the transformer 14'. The manner of control of the device 11" thus corresponds with that for the element 11 of FIG. 1, if it is assumed that the base of the transistor 11 is directly connected to the junction of the armature 1 and of the winding 2 and that the charging resistor 7 is variable.

The rectifier 12 of FIGS. 1 and 3 is replaced by an impedance comprising a capacitor 22 and an inductor 23, which are connected in series and constitute, together with the inductor winding 2, a resonant circuit tuned to the frequency of the alternating supply voltage from the source 3. This resonant circuit is therefore energized by each of the current pulses I which pass alternately through either of the rectifiers 4 and 4'. This circuit preferably is damped below the critical value at which the circulating current through said circuit no longer changes polarity. Therefore, the energizing current through the winding 2 is an alternating current having a substantially sinusoidal variation. The counter E.M.F. of the armature 1 also is an alternating voltage, the waveform of which changes with the degree of saturation of the magnetic circuit of the motor 1, 2 corresponding to a greater or smaller content of odd-numbered harmonics.

The rectifier 4 is ignited when the difference between the positive voltage of the capacitor 5 and the negative voltage of the armature 1 exceeds the threshold voltage of the upper diode of the device 11". The rectifier 4' is ignited each time when the difference between the negative voltage of the capacitor 5 and the positive counter E.M.F. of the armature 1 exceeds the threshold voltage of the lower diode of the device 11".

The instant of ignition of each of the rectifiers 4 and 4' during the half period of suitable polarity of the voltage U from the source 3 is therefore a function of the values concerned of the capacitor 5 and of its charging resistor 7', and of the value of the counter E.M.F. across the armature 1. The latter value is in turn a function of the speed of rotation of the motor and of the driving torque desired from the motor. The magnetic circuit of the motor 1, 2 is saturated already at fairly low torques, so that this counter E.M.F. has a substantially constant value during the major part of each half period of the supply voltage U. This value is independent of the driving torque and is proportional to the speed of rotation of the motor. For each setting of the variable charging resistor 7', the phase angle of the instants of ignition of the rectifiers 4 and 4' assumes a given value, which is mainly determined by the speed of rotation of the motor 1, 2, so that a given value of the speed of rotation of said motor corresponds to each of the settings of the resistor 7'. As before, the driving torque supplied by the motor has very little effect on the motor speed.

Figure 5:
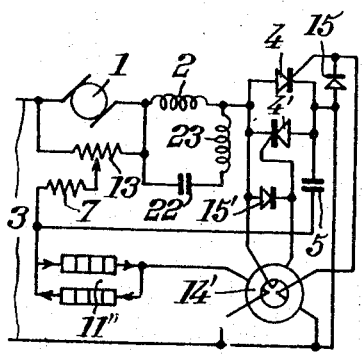

The fourth embodiment shown in FIG. 5 distinguishes from that of FIG. 4 in that the variable resistor 7' is replaced by a fixed resistor 7 and by a potentiometer 13 connected to the terminals of the armature 1. Also, the capacitor 5 again is connected so that it is charged via the resistor 7 by the difference between the alternating voltage U of the source 3, and the portion of the counter E.M.F. F of the armature 1 which occurs across the left-hand part of the potentiometer 13. The bilaterally conducting device 11" abruptly conducts each time the alternately positive and negative charging voltage of the capacitor 5 exceeds the threshold voltage. The operation of this embodiment is otherwise identical to that of the third embodiment of FIG. 4.

Figure 6:
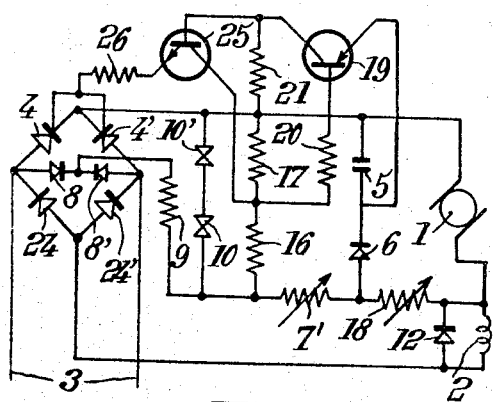

The fifth embodiment shown in FIG. 6 comprises a bridge rectifier having two controlled rectifiers 4 and 4' and two rectifiers 24 and 24'. The alternating voltage of the source 3 may therefore be alternately applied to the motor 1, 2 through a controlled rectifier 4 and the opposite rectifier 24', and through a controlled rectifier 4' and the rectifier 24. The bridge rectifier rectifies the two half periods and the pulsatory current thus produced passes invariably in the same direction through the motor 1, 2.

Two additional rectifiers 8 and 8' also constitute a bridge rectifier together with the rectifiers 24 and 24'. The positive pulsatory voltage appearing between the junction of the rectifiers 8 and 8' and the cathodes of the rectifiers 4 and 4' is applied to a limiting element formed by one or more Zener diodes 10 and 10' connected in series through a resistor 9. The capacitor 5 is charged through a variable charging resistor 7' and a rectifier 6 to the limited voltage of the diodes 10, 10'. The counter E.M.F. of the armature 1 is also applied to the series combination of said capacitor and the rectifier 6 through a second variable resistor 18, so that the charging of the capacitor is counteracted. In this way the resultant voltage of the capacitor 5 varies during each half period of the supply voltage U and is a function of the counter E.M.F. of the armature 1, and hence of the speed of rotation of the motor 1, 2.

The emitter of a transistor 19 of the p-n-p type is connected to the junction of the rectifier 6 and the capacitor 5 and its collector is connected to the cathodes of the rectifiers 4 and 4' through a charging resistor 21. The base of transistor 19 is connected through a resistor 20 to the tapping of an ohmic voltage divider 16, 17, which is connected in parallel with the diodes 10 and 10' of the voltage limiter. In this way the transistor 19 constitutes the threshold-voltage element, above which voltage it becomes conducting, said voltage being slightly higher (about 0.1 v. higher) than the voltage across the resistor 17.

The control electrodes of the two rectifiers 4 and 4' are connected to the emitter of a further transistor 25, through a resistor 26. The base of the transistor 25, of the n-p-n type, is directly connected to the collector of the transistor 19 and the collector is directly connected to the tapping of the potentiometer 16, 17. In this way the transistors 19 and 25 constitute a trigger circuit together with the resistors 16 and 21. During each half period of the supply voltage U the transistor 19 is first cut off. A positive voltage equal to a given portion $$\frac{R_{17}}{R_{16}+R_{17}}$$

of the limited voltage across the Zener diodes 10 and 10' appears almost immediately across the tapping of the voltage divider 16, 17 and hence also at the base. At the same time, the capacitor 5, which had previously been discharged, has not yet received an appreciable charge through the emitter-collector circuit of the transistor 19. Since the transistor 19 is cut off, the transistor 25 is also cut off because its base is at the potential of the cathodes of the rectifiers 4 and 4', and the emitter is at the substantially equal potential of the control electrodes of said rectifiers. As soon as the limited voltage $V_{10}$ appears across the diodes 10 and 10', the resultant current through the resistors 7' and 18 assumes, by the sum of said voltage and of the counter E.M.F. F, a value equal to $$i = \frac{V_{10}+F}{R_{7'}+R_{18}}$$

If the voltage $V_{10}-i \cdot R_7$ is higher than the voltage $$F-i \cdot R_{18}$$

the junction of the resistors 7' and 18 becomes positive relative to the cathodes of the rectifiers 4 and 4' and the capacitor 5 is charged through the rectifier 6. It will be obvious that the intensity of said charging current, and hence also the time elapsing between each half period up to the instant when the emitter of the transistor 19 becomes positive relative to its base, can be readily varied within a wide range by variation of the resistors 7' and 18.

As soon as the emitter of the transistor 19 becomes positive relative to its base, the capacitor 5 starts discharging across the emitter-collector circuit of the transistor 19 and the resistor 21. As a result, the collector of said transistor and the base of the transistor 25 become positive relative to the cathodes (and the control electrodes) of the rectifiers 4 and 4'. The collector current of the transistor 19 thus passes for the major part through the emitter-base circuit of the transistor 25, which thus becomes conducting, and it finally reaches the control electrode through the resistor 26. The collector of the transistor 25, however, is positive relative to the cathodes of the rectifiers 4 and 4', since it is directly connected to the tapping of the voltage divider 16, 17. A collector current $\alpha'$ higher than the base current passes through the resistor 16 and the collector-emitter circuit of the transistor 25 towards the control-electrodes of the rectifiers 4 and 4'. This current reduces the positive polarising voltage of the base of the transistor 19, which thus becomes more strongly conducting. The result is a cumulative trigger effect such that the combination of the transistors 19 and 25 becomes rapidly and abruptly equivalent to a short-circuit. The capacitor 5 then is discharged through the resistor 26 and the control circuits of the rectifiers 4 and 4', the anode of which is positive at the instant concerned.

In a practical embodiment of FIG. 6, the motor was formed by a series commutator motor having an inductor 2 of about 80 mh. and a resistor of about 0.65 ohm. The consumption was about 6 A. and the driving torque produced was about 2.8 kgs. cm. at a speed of rotation of about 7000 rev./min. The voltage U of the source 3 was 220 v. with a frequency of 50 c./s. The device comprised the following parts.

Rectifiers 4,4': controlled silicon rectifiers, Philips BTY 87
Capacitor 5: electrolytic capacitor, 3 μf. 40 v.
Rectifiers 6, 8 and 8': silicon diodes, Philips BY 100 S
Zener diodes 10, 10': three diodes, Philips BZZ 15, in series
Rectifiers 12, 24 and 24': each formed by two silicon diodes, Philips BYZ 10, in parallel connection
Transistor 19: Philips AC 128
Transistor 25: Philips AC 127
Resistor 7': 0 to 10K ohms 1 w. in series with 82 ohms ½ w.
Resistor 18: 0 to 10K ohms 3w.
Resistor 9: 3K ohms 20 w.
Resistor 16: 1K ohm ½ w.
Resistor 17: 680 ohms ½ w.
Resistors 10 and 26: 33 ohms, ¼ w.
Resistor 21: 82K ohms ¼ w.

Under these conditions, a speed of 300 rev./min. was attained when the resistor 18 was adjusted to about 2K ohms and the resistor 7' between 1 and 2K ohms. The speed varied only 20 rev./min. with an increase in the braking torque from 2 to 40 kgs. cm.

When the resistor 18 was raised to its maximum value and when the resistor 7' was reduced to slightly less than 1K ohm, the motor attained a speed of 7000 rev./min., which dropped to 6500 rev./min. at an increase in the torque from 1 to 4 kgs. cm.

The device described above, designed for driving a washing and centrifugal machine, may produce a speed variation within a range from 1 to 20 without the use of a mechanical change speed gear, yet at the lowest speeds the efficiency remains about 20% and increases rapidly at the chosen operational speed.

In accordance with the properties of the motor, e.g. if its armature 1 has a fairly high inductance and a comparatively low ohmic resistance, it may be advantageous to shunt this armature by a rectifying element connected in the cut-off direction with respect to the current through the controlled rectifier. On the other hand, although the rectifying element 12 of FIGS. 1, 3 and 6 is considerably more advantageous from the point of view of price and size, and also with respect to its operation in the case where the supply voltage is a pulsatory current of one polarity, it might be replaced, also in these cases, by an impedance, for example, such as elements 22, 23 of FIG. 4 and 5. Inductor 23 and capacitor 22 constitute, together with the energizing winding 2, an oscillating circuit tuned to a frequency lower than or equal to that of the voltage of the source 3, or lower than or equal to half of said frequency, according as the motor is fed during each half period of the voltage of said source or only during alternate half periods, as is illustrated in FIGS. 1 and 3. In either of these cases the damping of said oscillating circuit should preferably be lower than the critical value at which the circulating current produced by each pulse no longer changes polarity.

It will be obvious that the present invention is not restricted to the particular examples shown in the drawing, and that numerous modifications and combinations of said embodiments are possible within the scope of the invention. Although the diagrams relate to single-voltage motors, the invention may be applied, without modification of the essential parts and properties shown in these diagrams, to motors coupled for two voltages.

What is claimed is:
1. A control circuit for a commutator motor having an armature winding and a field winding connected in series comprising, a controlled rectifier having first and second electrodes which define a current path therein and a control electrode for initiating current flow in said path, a pair of input terminals arranged to be connected to a source of alternating current, means connecting said motor in a first series circuit with said first and second electrodes of said controlled rectifier across said input terminals, the first electrode being directly connected to one of said input terminals, a first resistor and a capacitor connected in a second series circuit across said input terminals and in parallel with said first series circuit so that said capacitor is charged to a given voltage level during a portion of the period said controlled rectifier is non-conductive, means including a device having a given threshold voltage coupled to said control electrode and responsive jointly to the voltage across said capacitor and the induced voltage in the motor armature for controlling the ignition point of said controlled rectifier in accordance therewith, and circuit means shunting said field winding so as to provide a circulating current path for the energy of said field winding during said non-conductive periods of the controlled rectifier.

2. A circuit as described in claim 1 wherein said circuit means shunting said field winding comprises a current rectifying element connected in the reverse direction with respect to said controlled rectifier.

3. A circuit as described in claim 1 wherein said connecting means are arranged so that the controlled rectifier is serially connected between one of said input terminals and the motor armature and wherein the other of said input terminals is connected to said field winding.

4. A circuit as described in claim 3 wherein said ignition controlling means is arranged to respond to a voltage which is the difference between the capacitor charge voltage and a portion of said armature voltage, said difference voltage being applied to said threshold device so as to trigger same into conduction as soon as said difference voltage exceeds said threshold voltage thereby to provide a discharge path for said capacitor.

5. A control circuit for a commutator motor having an armature winding and a field winding connected in series comprising, a controlled rectifier having an anode and cathode which define a current path therein and a control electrode for initiating current flow in said path, a pair of input terminals arranged to be connected to a source of alternating current, means connecting said motor in a first series circuit with the anode and cathode of said controlled rectifier across said input terminals, a first resistor and a capacitor connected in a second series circuit across said input terminals and in parallel with said first series circuit, whereby said capacitor is arranged to charge during the period said controlled rectifier is non-conductive, a current rectifying element serially connected with said capacitor in the charge circuit thereof, means for coupling a portion of the armature back E.M.F. to said capacitor with a polarity opposing the charge voltage so that the resultant voltage across said capacitor is dependent upon said back E.M.F., a threshold trigger device having an input coupled to said capacitor and an output coupled to said control electrode, whereby said device is abruptly triggered into conduction to discharge said capacitor when the resultant voltage thereon exceeds the threshold voltage of said device, said device thereby supplying an ignition pulse to said control electrode for initiating current flow in said controlled rectifier at a point in the cycle of said AC current which is dependent upon said back E.M.F., and circuit means shunting said field winding so as to provide a circulating current path for the energy of said field winding during said non-conductive periods of the controlled rectifier.

6. A circuit as described in claim 5 wherein said coupling means comprises a variable resistor connected to said armature winding and coupled to said capacitor via a current path including said current rectifying element.

7. A circuit as described in claim 6 wherein said threshold trigger device comprises a transistor having base, emitter and collector electrodes, said circuit further comprising voltage amplitude limiting means shunting said capacitor, means for applying a part of the voltage across said amplitude limiting means to said base electrode in a reverse bias sense to operate as a threshold voltage, means connecting said emitter to said capacitor, and means coupling said collector to the control electrode of said controlled rectifier.

8. A circuit as described in claim 7 further comprising a second transistor having its emitter-collector circuit coupled to the collector of said first transistor and to the control electrode of said controlled rectifier, and means for coupling the collector of said second transistor to the base of said first transistor so that said first and second transistors and said capacitor together form a trigger circuit arranged to supply an ignition pulse to the control electrode of said controlled rectifier when the voltage across the capacitor exceeds the threshold voltage level.

9. A control circuit for a single phase commutator motor having an armature winding and a field winding connected in series comprising, a controlled rectifier having an anode and cathode which define a current path therein and a control electrode for initiating current flow in said path, a pair of input terminals arranged to be connected to a source of alternating current, means connecting said motor in a first series circuit with the anode and cathode of said controlled rectifier across said input terminals with the motor armature directly connected to one of said input terminals, a first resistor and a capacitor connected in a second series circuit across said input terminals with one terminal of said capacitor connected to the other of said input terminals, whereby said capacitor is arranged to charge during the period said controlled rectifier is non-conductive, means for coupling a portion of the armature back E.M.F. to said capacitor such that said capacitor is charged by the difference between the source voltage and said portion of the back E.M.F., means responsive to the voltage across said capacitor for supplying an ignition pulse to said control electrode when the voltage of said capacitor exceeds a given threshold level, and circuit means shunting said field winding so as to provide a circulating current path for the energy of said field winding during said non-conductive periods of the controlled rectifier.

10. A circuit as described in claim 9 wherein said ignition pulse supplying means comprises a threshold diode connected in shunt with said capacitor so as to discharge the capacitor when the voltage thereon exceeds the diode threshold voltage, the discharge current of the capacitor through said diode being operative to produce said ignition pulse.

11. A control circuit for a single phase commutator motor having an armature winding and a field winding connected in series comprising, first and second controlled rectifiers each having a control electrode for initiating current flow therein, a pair of input terminals arranged to be connected to a source of alternating current, means connecting said first and second controlled rectifiers in reverse-parallel and in a first series circuit with said motor across said input terminals, a first resistor and a capacitor connected in a second series circuit across said input terminals and in parallel with said first series circuit, whereby said capacitor is arranged to charge during the periods said controlled rectifiers are non-conductive, means coupled to the control electrodes of said first and second controlled rectifiers and responsive jointly to the charge voltage of said capacitor and the back E.M.F. of the motor armature for periodically discharging said capacitor so as to alternately ignite said first and second controlled rectifiers at points in the cycle of said AC current which are dependent upon said back E.M.F., and impedance means including a second capacitor connected in shunt with said field winding and arranged to form with said field winding a resonant circuit tuned to the frequency of said alternating current source.

12. A circuit as described in claim 11, wherein said capacitor discharging means comprises, bilaterally conducting threshold diode means, a transformer having a primary winding and first and second secondary windings, means connecting said threshold diode means and said primary winding in series across said capacitor, and means connecting said first and second secondary windings to the control electrodes of said first and second controller rectifiers, respectively, whereby said capacitor is discharged across said threshold diode means and said primary winding when the diode threshold voltage is exceeded thereby to alternately trigger said first and second controlled rectifiers into conduction.

13. A control circuit for a single phase commutator motor having an armature winding and a field winding connected in series comprising, a pair of input terminals arranged to be connected to a source of alternating current, a bridge circuit having first and second branches connected between said input terminals and a first pair of output terminals, said first branch comprising first and second series connected controlled rectifiers, said second branch comprising first and second series connected diodes, means connecting said motor armature winding and said field winding in series across said bridge output terminals, third and fourth diodes connected in series across said input terminals to form a second bridge circuit with said first and second series connected controlled rectifiers and having a second pair of output terminals, a resistor, a fifth diode, and a capacitor connected in a first series circuit across said second pair of output terminals so as to provide a charge path for said capacitor, a variable resistor, means connecting said variable resistor, said fifth diode and said capacitor in series across said motor armature winding so that the armature back E.M.F. is applied to said fifth diode and said capacitor in a sense to counteract the charging of said capacitor, a threshold trigger device having an input coupled to said capacitor and an output coupled to the control electrodes of said first and second controlled rectifiers, said trigger device being abruptly triggered into conduction to discharge said capacitor when the voltage of said capacitor exceeds the threshold voltage of said device thereby to alternately supply ignition pulses to said first and second controlled rectifiers at points in the cycle of said AC current which are dependent upon said back E.M.F., an inductor and a second capacitor connected in series with each other and in shunt with said field winding and arranged to form with said field winding a resonant circuit tuned to a frequency approximately equal to the frequency of said AC source.

14. A control system for a commutator motor having a series-connected armature and field winding comprising, a pair of input terminals for connection to a source of alternating current, a controlled rectifier having an anode and cathode which define a current path and a control electrode for initiating current flow in said path, means connecting the armature, the field winding and the anode-cathode path of the rectifier in series circuit across said input terminals, a capacitor, means coupled to said input terminals and including a resistor and a diode for providing a unidirectional charge path for said capacitor having a given time constant, means for coupling said armature to said capacitor via a current path that is independent of the field winding and includes said diode, the induced voltage in said armature being coupled to said capacitor with a polarity opposing that of the voltage supplied by said charge path, whereby the rate of charge of said capacitor is jointly determined by said time constant and the armature voltage, but is substantially independent of the field voltage, threshold trigger means having an input coupled to said capacitor and an output coupled to said control electrode and providing a discharge path for said capacitor, and means connected in shunt with said field winding to permit the flow of current in said field winding during the non-conductive period of said controlled rectifier.

15. A control system for a commutator motor having a series-connected armature and field winding comprising a pair of input terminals for connection to a source of alternating current, a controlled rectifier having first and second electrodes which define a current path and a control electrode for initiating current flow in said path, means connecting the armature, the field winding and the current path of the rectifier in series circuit across said input terminals so that one terminal of said armature is directly connected to one terminal of said field winding and said first electrode is directly connected to one of said input terminals, a capacitor, a resistor, means connecting said resistor in series with said capacitor across said input terminals to provide a charge path for the capacitor, means coupled to said capacitor and to said armature for combining the capacitor voltage and the induced armature voltage in a manner to produce a control voltage that is independent of the field voltage, means for coupling said control voltage to said control electrode to initiate conduction in said controlled rectifier at a point in the cycle determined jointly by the armature voltage and the capacitor voltage, and means connected in shunt with said field winding to permit the flow of current in said field winding during the non-conductive period of said controlled rectifier.

16. A circuit as described in claim 1 wherein said circuit means includes bilaterally conductive reactance means which form, together with said field winding, a resonant circuit tuned to a frequency that bears a predetermined relationship with respect to the frequency of said alternating current source.

17. A circuit as described in claim 1 wherein said threshold device comprises a transistor having its collector connected to the control electrode of said controlled rectifier and its emitter and base coupled to said capacitor and to said motor armature.

References Cited

UNITED STATES PATENTS

| | | | |
|---|---|---|---|
| 3,195,029 | 7/1965 | Gilbreath | 318—345 X |
| 3,222,586 | 12/1965 | Fontenote et al. | 318—345 X |
| 3,222,585 | 12/1965 | Lobb | 318—345 X |
| 3,233,161 | 2/1966 | Sikorra | 318—345 X |
| 3,242,410 | 3/1966 | Cockrell | 318—331 |
| 3,300,700 | 1/1967 | Wigington | 318—246 |

BENJAMIN DOBECK, *Primary Examiner.*